(12) United States Patent
Cope (10) Patent No.: US 9,253,614 B2
(45) Date of Patent: Feb. 2, 2016

(54) COMMUNICATION SYSTEM PROVIDING INTEGRATED WIRELESS AND PACKET COMMUNICATION SERVICES

(71) Applicant: Sprint Communications Company L.P., Overland Park, KS (US)

(72) Inventor: Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 110 days.

(21) Appl. No.: 14/251,262

(22) Filed: Apr. 11, 2014

(65) Prior Publication Data

US 2014/0219137 A1    Aug. 7, 2014

Related U.S. Application Data

(63) Continuation of application No. 11/479,370, filed on Jun. 29, 2006, now Pat. No. 8,879,537.

(51) Int. Cl.

| | |
|---|---|
| *H04W 4/16* | (2009.01) |
| *H04M 3/46* | (2006.01) |
| *H04M 7/00* | (2006.01) |
| *H04M 7/12* | (2006.01) |
| *H04L 12/28* | (2006.01) |
| *H04M 3/42* | (2006.01) |
| *H04M 3/54* | (2006.01) |
| *H04W 88/18* | (2009.01) |

(52) U.S. Cl.
CPC .............. *H04W 4/16* (2013.01); *H04L 12/2803* (2013.01); *H04M 3/465* (2013.01); *H04M 7/0093* (2013.01); *H04M 7/123* (2013.01); *H04M 3/42017* (2013.01); *H04M 3/54* (2013.01); *H04M 2207/18* (2013.01); *H04W 88/18* (2013.01)

(58) Field of Classification Search
CPC ...................................................... H04W 4/16
See application file for complete search history.

(56) References Cited

U.S. PATENT DOCUMENTS

| | | |
|---|---|---|
| 6,208,854 B1 | 3/2001 | Roberts et al. |
| 6,275,577 B1 | 8/2001 | Jackson |
| 7,162,020 B1 * | 1/2007 | Forte .................. 379/201.01 |
| 7,630,481 B2 | 12/2009 | Kafka |
| 7,734,294 B2 | 6/2010 | Kent, Jr. et al. |
| 2002/0132638 A1 | 9/2002 | Plahte et al. |
| 2003/0016795 A1* | 1/2003 | Brandenberger .......... 379/93.11 |
| 2004/0248593 A1* | 12/2004 | Hicks et al. .................. 455/462 |

(Continued)

FOREIGN PATENT DOCUMENTS

| | | |
|---|---|---|
| WO | 9967922 | 12/1999 |
| WO | 2005004452 | 1/2005 |

*Primary Examiner* — Asad Nawaz
*Assistant Examiner* — Saad A Waqas (57) ABSTRACT

A communication system receives a communication for a phone number and determines if the phone number is shared by a wireless phone and a packet appliance. If the phone number is shared, then the communication system determines if the wireless phone is logged-in to a wireless network and if the packet appliance is logged-in to a packet network. If the wireless phone is logged-in, then the communication system transfers the communication to the wireless network for delivery to the wireless phone. If the packet appliance is logged-in, then the communication system transfers the communication to the packet network for delivery to the packet appliance. The communication may be simultaneously transferred to the wireless network and the packet network if the phone number is shared and the wireless phone and the packet appliance are both logged-in.

20 Claims, 8 Drawing Sheets

(56) References Cited

U.S. PATENT DOCUMENTS

| | | |
|---|---|---|
| 2005/0009526 A1 | 1/2005 | Sheinbein et al. |
| 2005/0053219 A1 | 3/2005 | Pearson et al. |
| 2005/0069097 A1 | 3/2005 | Hanson et al. |
| 2005/0195802 A1 | 9/2005 | Klein et al. |
| 2006/0077956 A1 | 4/2006 | Saksena et al. |
| 2007/0015535 A1* | 1/2007 | LaBauve et al. ........... 455/552.1 |
| 2007/0149182 A1 | 6/2007 | Muratore et al. |
| 2007/0153999 A1* | 7/2007 | Daigle .................... 379/142.07 |

\* cited by examiner

COMMUNICATION SYSTEM PROVIDING INTEGRATED WIRELESS AND PACKET COMMUNICATION SERVICES

RELATED APPLICATIONS

This patent application is a continuation of U.S. patent application Ser. No. 11/479,370 that was filed on Jun. 29, 2006 and is entitled "COMMUNICATION SYSTEM PROVIDING INTEGRATED WIRELESS AND PACKET COMMUNICATION SERVICES." U.S. patent application Ser. No. 11/479,370 is hereby incorporated by reference into this patent application.

BACKGROUND OF THE INVENTION

The invention is related to the field of communications, and in particular, to a communication system that provides integrated service over wireless networks and packet networks. A wireless telephone places calls over a wireless network. The wireless network often exchanges these calls with other telephone networks, such as the Public Switched Telephone Network (PSTN). The wireless network and telephone offer features, such as instant messaging, voice mail, call logs, and address books. For example, a user may place a call by selecting an entry in a call log or address book.

An Internet Protocol (IP) telephone places calls over an IP network. The IP network often exchanges these calls with other telephone networks, such as the PSTN. The IP network and telephone also offer features, such as voice mail, call logs, and address books.

Unfortunately, the integration of communication services over wireless networks and IP networks is currently ineffective. The user cannot get integrated telephone service over both wireless and IP networks using a single telephone number. The user cannot get access to integrated voice mail, call logs, and address books for both wireless and IP networks.

SUMMARY OF THE INVENTION

Examples of the invention include a communication system and its method of operation. The communication system receives a communication for a phone number and determines if the phone number is shared by a wireless phone and a packet appliance. If the phone number is shared, then the communication system determines if the wireless phone is logged-in to a wireless network and if the packet appliance is logged-in to a packet network. If the wireless phone is logged-in, then the communication system transfers the communication to the wireless network for delivery to the wireless phone. If the packet appliance is logged-in, then the communication system transfers the communication to the packet network for delivery to the packet appliance. The communication may be simultaneously transferred to the wireless network and the packet network if the phone number is shared and the wireless phone and the packet appliance are both logged-in.

BRIEF DESCRIPTION OF THE DRAWINGS

The same reference number represents the same element on all drawings.

DETAILED DESCRIPTION OF THE PREFERRED EMBODIMENT

The following description and figures depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
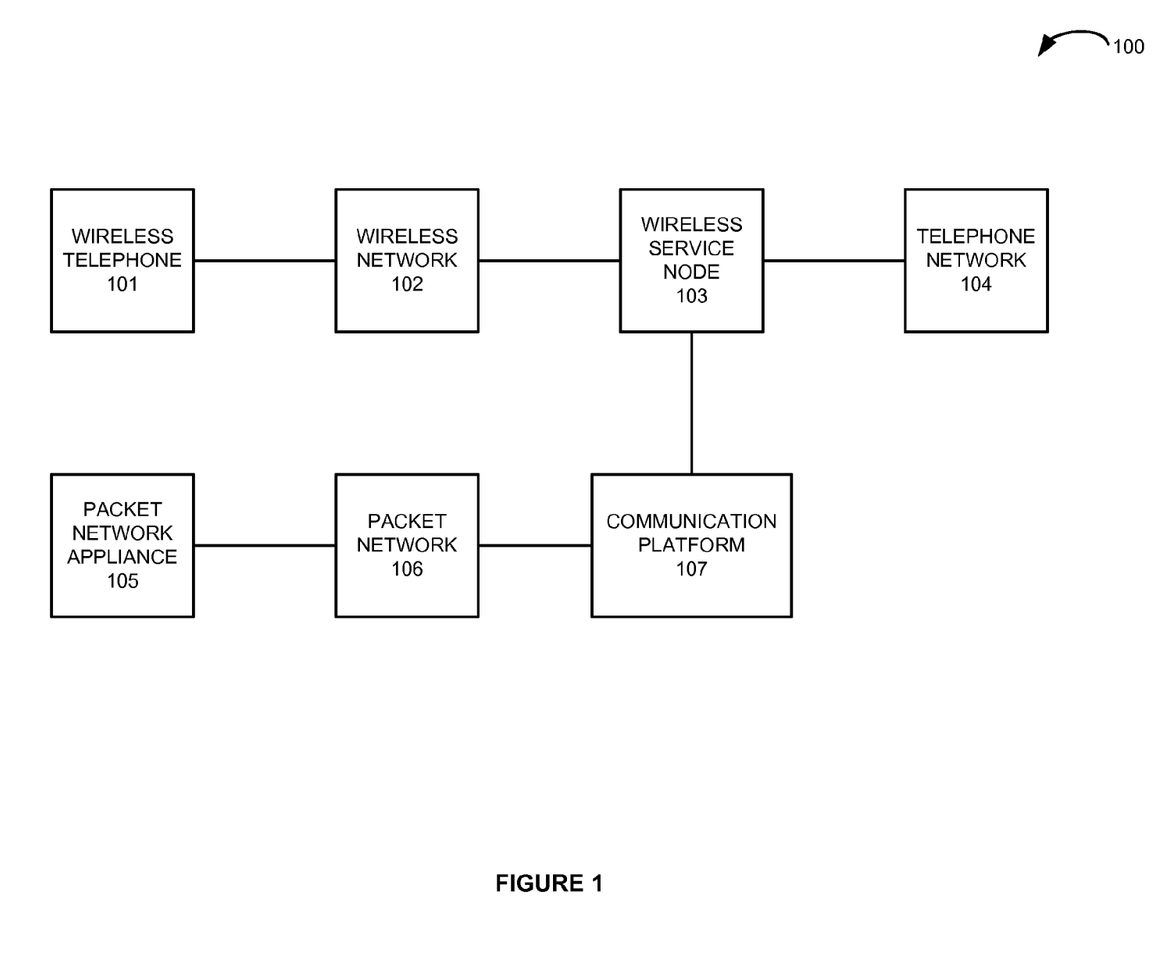
FIG. 1 illustrates a communication system in an example of the invention.

FIG. 1 illustrates communication system 100 in an example of the invention. Communication system 100 includes wireless telephone 101, wireless network 102, wireless service node 103, telephone network 104, packet network appliance 105, packet network 106, and communication platform 107. Wireless service node 103 can communicate with wireless telephone 101 over wireless network 102. Wireless service node 103 is also coupled to telephone network 104 and platform 107. Platform 107 can communicate with packet network appliance 105 over packet network 106.

Wireless telephone 101 could be any device or system configured to communicate with wireless service node 103 over wireless network 102. Some examples of wireless telephone 101 include mobile telephones, cellular telephones, computers, and personal digital assistants.

Wireless network 102 could be any device or system that communicates with wireless telephone 101 over an air interface. Some examples of wireless network 102 include Code Division Multiple Access (CDMA) networks, Global System for Mobile Communications (GSM) networks, Wireless Fidelity (WIFI) networks, and WiMax networks.

Wireless service node 103 could be any device or system that controls communications with wireless telephone 101 over wireless network 102. Wireless service node 103 also interfaces with telephone network 104 and platform 107. Some examples of wireless service node 103 include mobile switching centers, wireless access points, service control points, and soft switches.

Telephone network 104 could be any device or system that transfers communications between telephones. Some examples of telephone network 104 include the Public Switched Telephone Network (PSTN), enterprise telephone networks, IP telephone networks, and wireless telephone networks.

Packet network appliance 105 could be any device or system that communicates over packet network 106. Some examples of packet network appliance 105 include computers, terminal adapters, IP gateways, personal digital assistants, and packet telephones. The packet format could be IP, Asynchronous Transfer Mode (ATM), Ethernet, or some other packet format.

Packet network 106 could be any device or system that transfers packets. Some examples of packet network 106 include IP networks, ATM networks, and Ethernet networks.

Communication platform 107 could be any computer platform with communication interfaces that is configured to operate as described herein. Platform 107 may be integrated into other devices and systems. Platform 107 may be distributed across several devices and systems. Platform 107 could comprise a properly configured Centrex Server from Avaya or Broadsoft.

Figure 2:
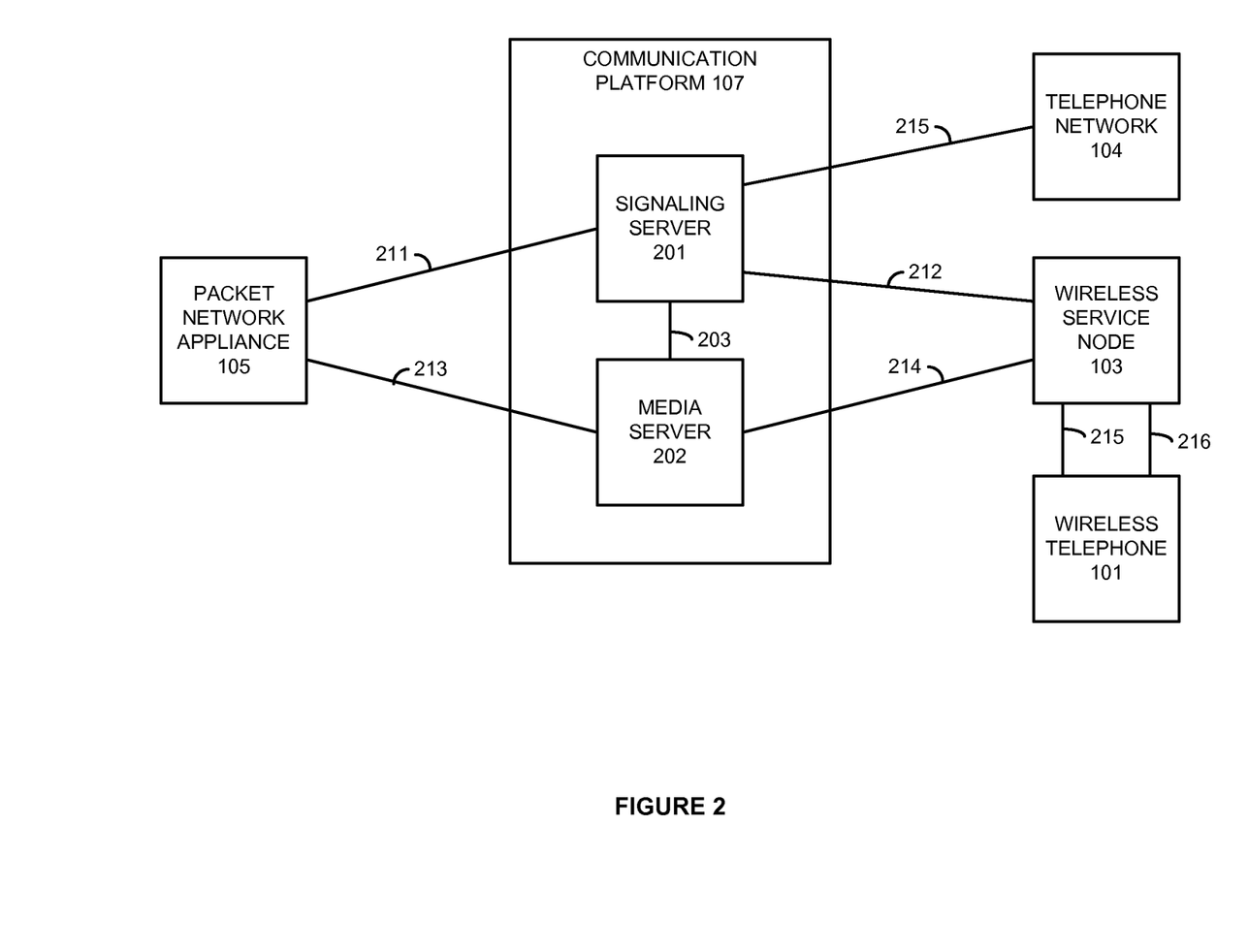
FIG. 2 illustrates a communication platform in an example of the invention.

FIG. 2 illustrates communication platform 107 in an example of the invention. Platform 107 includes signaling server 201 and media server 202. Signaling server 201 and media server 202 could be computerized communication systems with communication interfaces. Signaling server 201 and media server 202 communicate over control link 203.

Signaling server 201 and packet network appliance 105 exchange telecommunication signaling over signaling link 211. This signaling could be Session Initiation Protocol (SIP) signaling or some other signaling format. Signaling server 201 and wireless service node 103 exchange telecommunication signaling over signaling link 212. This signaling could be Signaling System Seven (SS7) signaling or some other signaling format. Signaling server 201 and telephone network 104 exchange telecommunication signaling over signaling link 215. This signaling could be SS7 signaling or some other signaling format.

Wireless service node 103 exchanges signaling with wireless telephone 101 over wireless signaling link 215. This signaling could be any form of wireless telecommunication signaling. Signaling server 201 may also exchange signaling with wireless telephone 101 over signaling links 212 and 215. This signaling may be converted from one format to another by wireless service node 103.

Media server 202 and packet network appliance 105 exchange user communications over bearer link 213. These user communications could be packet voice, text messages, or some other type of packet-based user communication. Media server 203 and wireless service node 103 exchange user communications over bearer link 214. These user communications could be Time Division Multiplex (TDM) voice, packet voice, text messages, or some other type of user communication. Wireless service node 103 and wireless telephone 101 exchange the user communications over bearer link 215. Thus, media server 202 and wireless telephone 101 can exchange the user communications over bearer links 214 and 216. These user communications may be converted from one format to another by wireless service node 103.

Note that packet network 106 is omitted from FIG. 2 for clarity, but packet network 102 transfers the signaling and user communications between platform 107 and appliance 105 over links 211 and 213. Also note that wireless network is omitted from FIG. 2 for clarity, but wireless service node 102 transfers the signaling and user communications between node wireless service 103 and wireless telephone 101 over wireless links 215-216.

Figure 3:
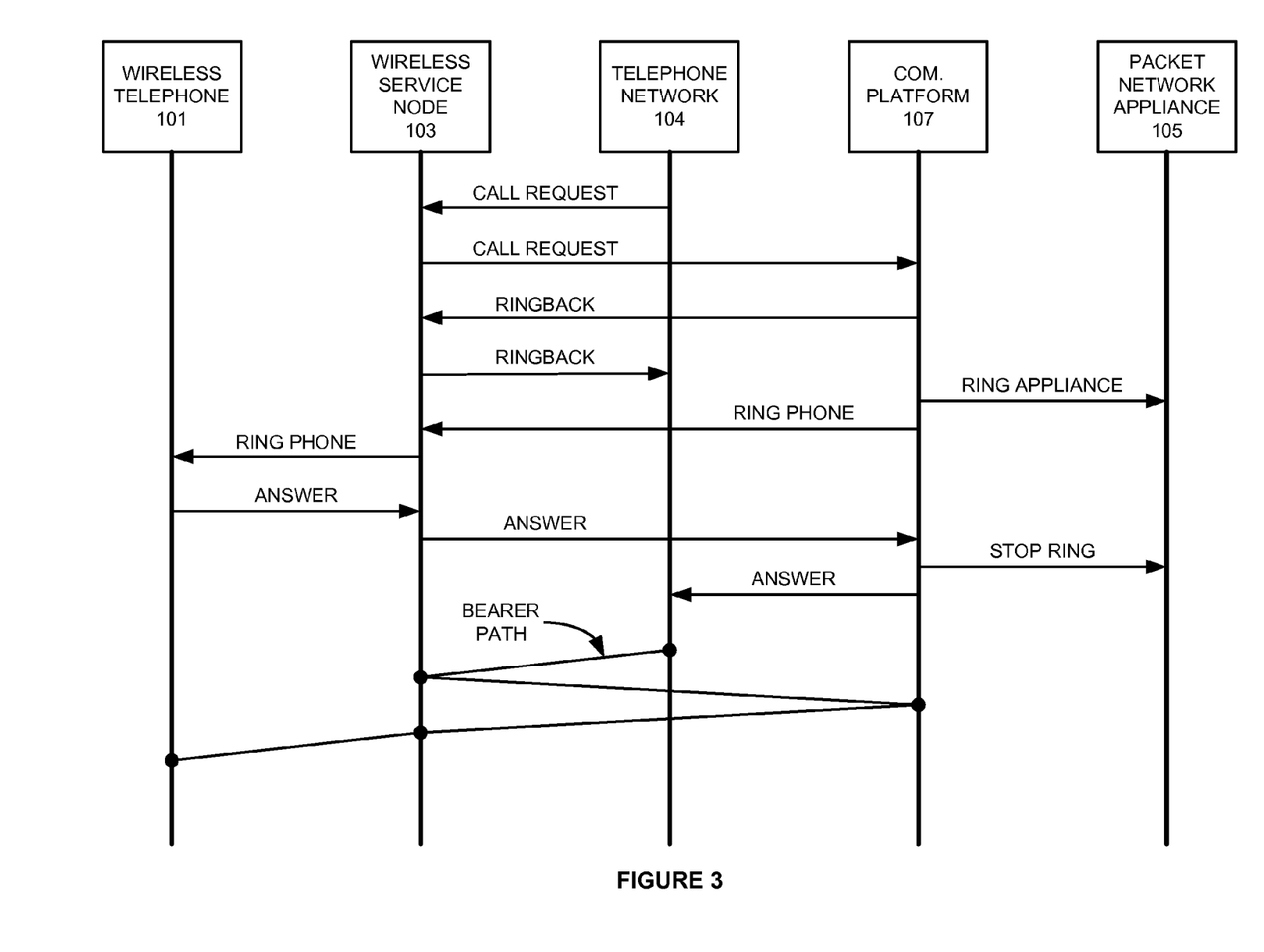
FIG. 3 illustrates a call through a telephone network to a wireless telephone in an example of the invention.

FIG. 3 illustrates a call through telephone network 104 to wireless telephone 101 in an example of the invention. A caller (not shown) places the call to a telephone number that is shared by wireless telephone 101 and packet appliance 105. Telephone network 104 receives call request signaling for the call, and in response, transfers call request signaling, such as an SS7 Initial Address Message (IAM), to wireless service node 103. Based on the shared telephone number in the call request, wireless service node 103 transfers a call request signaling to platform 107—this call request could be the same SS7 IAM received from telephone network 104. Wireless service node 103 also accepts a bearer path for the call from telephone network 104, and extends this bearer path to platform 107. In response to the call request signaling, platform 107 transfers a ringback tone over the bearer path to wireless service node 103, to telephone network 104, and on to the caller to indicate that the call is proceeding.

In response to the call request signaling, platform 107 identifies wireless telephone 101 and packet appliance 105 as associated with the called telephone number, and transfers separate ring instruction signaling to wireless service node 103 and packet network appliance 105. The ring instruction signaling to wireless service node 104 could be an SS7 IAM, and the ring instruction signaling to packet network appliance could 105 be a SIP invite. Platform 107 also extends the bearer path from wireless service node 103 over separate potential bearer paths to wireless service node 103 and to packet network appliance 105. Note that a potential bearer path through packet network 106 may consist of an IP address pair for packet network appliance 105 and platform 107

In response to the ring instruction signaling, packet network appliance 105 alerts the user of an incoming call through a ring, vibration, or other call alert. In response to the other ring instruction signaling, wireless service node 103 transfers ring instruction signaling to wireless telephone 101, and wireless telephone 101 alerts the user of an incoming call through a ring, vibration, or other call alert. Wireless service node 103 also extends the potential bearer path from platform 107 to wireless telephone 101.

Wireless service node 103 may need to distinguish the call request signaling transferred by telephone network 104 from the call request signaling (ring instructions) transferred by platform 107, since both could be SS7 IAMs. Wireless service node 103 could distinguish this signaling by analyzing a code, such as the source address of the signaling or some other code inserted by platform 107 in this signaling. Wireless service node 103 could identify the code to distinguish the signaling. For call request signaling from telephone network 104 specifying a shared telephone number, wireless service node 103 should forward the signaling to platform 107. For call request signaling from platform 107 specifying one of the shared telephone numbers, wireless service node 103 should extend the call to the appropriate wireless telephone.

Note that platform 107 initiates a simultaneous ring on both wireless telephone 101 and packet network appliance 105 in response to a call to the shared telephone number. Also note that platform 107 establishes separate potential bearer paths to both wireless telephone 101 and packet network appliance 105.

If desired, platform 107 can route incoming calls to only wireless telephone 101 if appliance 105 is not logged in to platform 107. If desired, platform 107 can route incoming calls to only appliance 105 if wireless telephone 101 is not on. Alternatively, the user can log into platform 107 and select call routing—route to both, route to telephone 101, or route to appliance 105.

In this example, the user answers wireless telephone 101. In response to the user's answer, wireless telephone 101 indicates to wireless service node 103 that it has been answered, and wireless service node 103 transfers answer signaling to platform 107 indicating that wireless telephone 101 has answered the call. In response to the answer signaling, platform 107 transfers answer signaling, such as an SS7 answer message, to telephone network 104. In response to the answer signaling, node 103, network 104, and platform 107 cut through the call over the bearer path to provide duplex communications between the caller and the called party (the user of wireless telephone 101). Note that before cut-through, only the portion of the duplex bearer path from the called party to the caller is operational, but after cut-through, the portion of the duplex bearer path from the caller to the called party becomes operational as well.

Platform 107 transfers stop ring signaling to packet network appliance 105, and in response, appliance 105 stops alerting the user for the incoming call. Platform 107 logs the call by recording the date, time, and telephone numbers associated with the call. Platform 107 also logs whether the call uses wireless telephone 101 or packet network appliance 105. Platform 107 also drops the potential bearer path to appliance 105. At this point, the duplex bearer path for the call extends from the caller (not shown) through telephone network 104 to wireless service node 103 to platform 107 then back to wireless service node 103 and on to wireless telephone 101.

Figure 4:
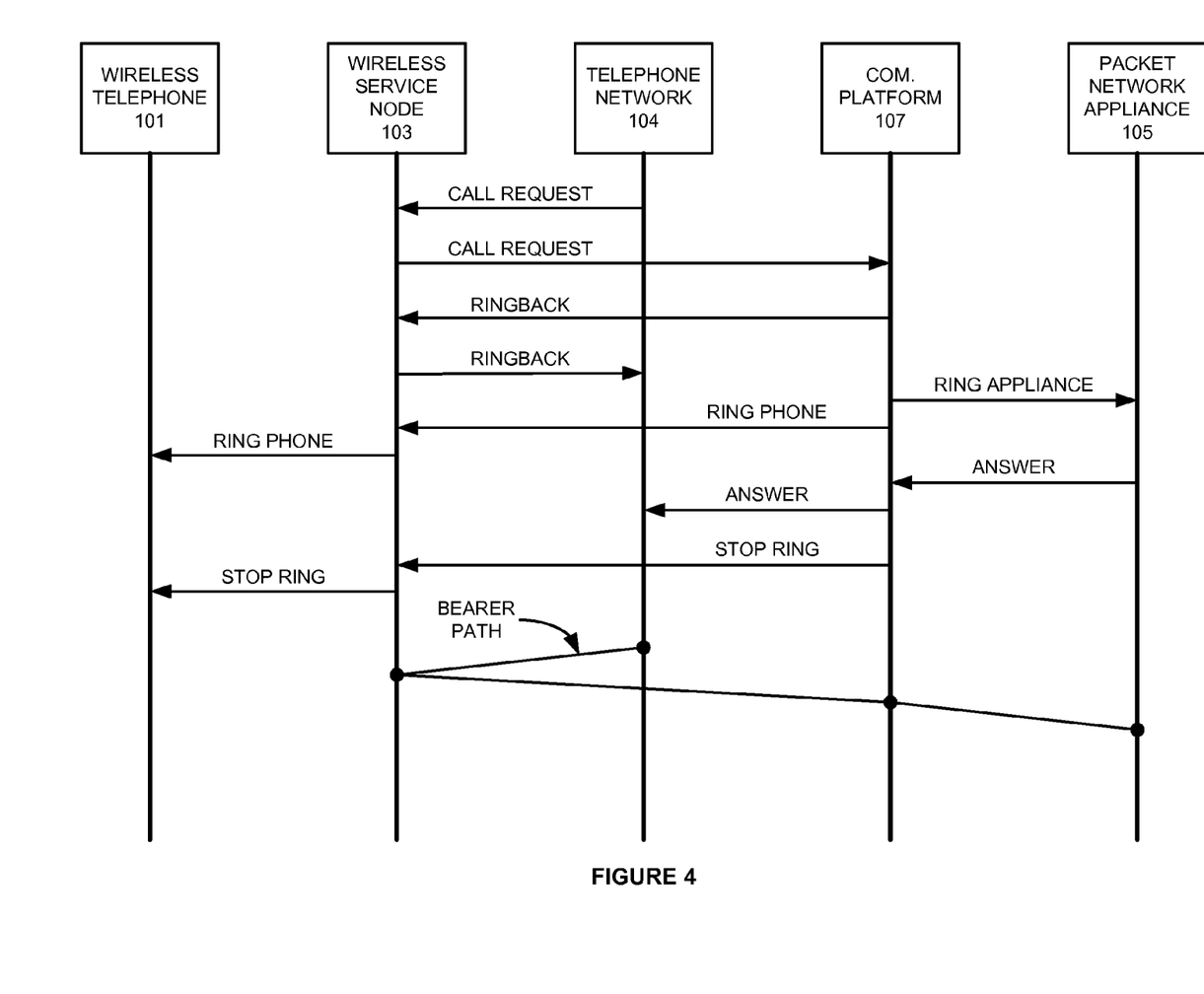
FIG. 4 illustrates a call through a telephone network to a packet network appliance in an example of the invention.

FIG. 4 illustrates a call through telephone network 104 to packet network appliance 105 in an example of the invention. A caller (not shown) places the call to the shared telephone number. Telephone network 104 receives call request signaling for the call, and in response, transfers call request signaling to wireless service node 103. Based on the shared telephone number in the call request, wireless service node 103 transfers call request signaling to platform 107. Wireless service node 103 also accepts a bearer path for the call from telephone network 104, and extends this bearer path to platform 107. In response to the call request signaling, platform 107 transfers a ringback tone over the bearer path to wireless service node 103, to telephone network 104, and on to the caller to indicate that the call is proceeding.

In response to the call request signaling, platform 107 identifies wireless telephone 101 and packet appliance 105 as associated with the called telephone number, and transfers separate ring instruction signaling to wireless service node 103 and packet network appliance 105. The ring instruction signaling to wireless service node 104 could be an SS7 IAM, and the ring instruction signaling to packet network appliance could 105 be a SIP invite. Platform 107 also extends the bearer path from wireless service node 103 over separate potential bearer paths to wireless service node 103 and to packet network appliance 105.

In response to the ring instruction signaling, packet network appliance 105 alerts the user of an incoming call through a ring, vibration, or other call alert. In response to the other ring instruction signaling, wireless service node 103 transfers ring instruction signaling to wireless telephone 101, and wireless telephone 101 alerts the user of an incoming call through a ring, vibration, or other call alert. Wireless service node 103 also extends the potential bearer path from platform 107 to wireless telephone 101.

In this example, the user answers packet network appliance 105. In response to the user's answer, packet network appliance 105 transfers answer signaling to platform 107 indicating that packet network appliance 105 has answered the call. In response to the answer signaling, platform 107 transfers answer signaling, such as an SS7 answer message, to telephone network 104. In response to the answer signaling, node 103, network 104, and platform 107 cut through the call over the bearer path to provide duplex communications between the caller and the called party (the user of packet network appliance 105). Note that before cut-through, only the portion of the duplex bearer path from the called party to the caller is operational, but after cut-through, the portion of the duplex bearer path from the caller to the called party becomes operational.

Platform 107 transfers stop ring signaling to wireless service node 103, and in response, wireless service node 103 transfers stop ring signaling to wireless telephone 101, and wireless telephone 101 stops alerting the user for the incoming call. Platform 107 logs the call by recording the date, time, and telephone numbers associated with the call. Platform 107 also logs whether the call uses wireless telephone 101 or packet network appliance 105. Platform 107 also drops the potential bearer path back to wireless service node 103, and wireless service node 103 drops the potential bearer path to wireless telephone 101. At this point, the duplex bearer path for the call extends from the caller (not shown) through telephone network 104 to wireless service node 103 to platform 107 and on to packet network appliance 105.

Figure 5:
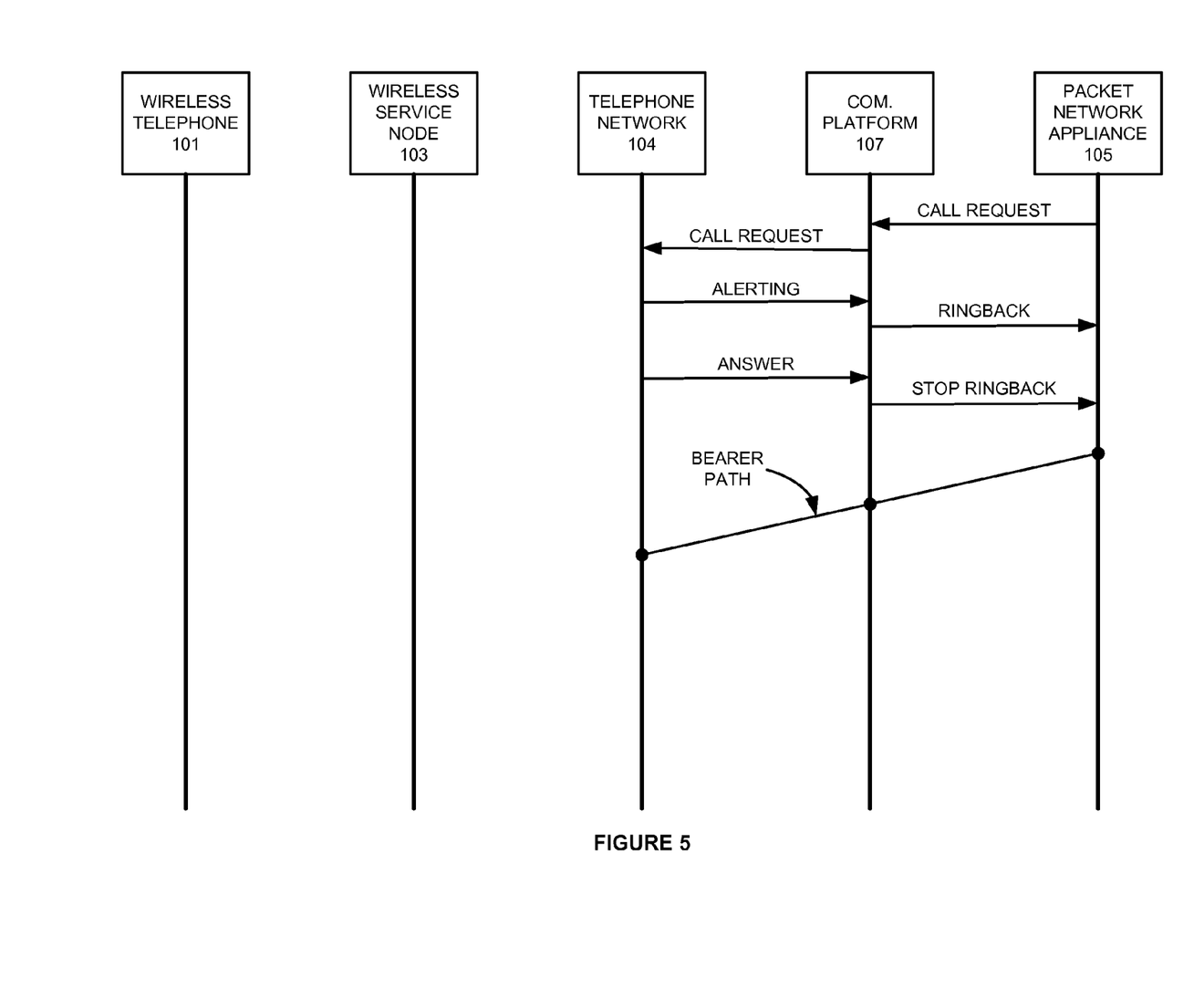
FIG. 5 illustrates a call from a packet network appliance through a telephone network to a called party in an example of the invention.

FIG. 5 illustrates a call from packet network appliance 105 through telephone network 104 to a called party in an example of the invention. The user operates packet network appliance 105 to transfer call request signaling, such as a SIP invite, to platform 107. In response, platform 107 transfers a call request, such as an SS7 JAM, to telephone network 104. Platform 107 places the shared telephone number as the caller telephone number in the call request signaling to telephone network 104. Thus, the telephone number shared with wireless telephone 101 is delivered to the caller as the Automatic Number Identification (ANI) on calls placed by packet network appliance 105.

Platform 107 establishes a bearer path from packet network appliance 105 to telephone network 104. Platform 107 receives alerting signaling from telephone network 104 indicating that the called party is being alerted. In response to the alerting signaling, platform 107 transfers ringback signaling to appliance 105, and appliance 105 plays a ringback tone to the caller (the user of appliance 105). Platform 107 receives answer signaling from telephone network 104 indicating that the called party has answered the call. In response to the answer signaling, platform 107 and telephone network 104 cut-through the bearer path. Platform 107 transfers stop ringback signaling to appliance 105, and appliance 105 stops playing the ringback tone to the caller. Platform 107 also logs the call as described above. At this point, the duplex bearer path for the call extends from packet network appliance 105 to platform 107 to telephone network 104 and on to the called party (not shown).

Figure 6:
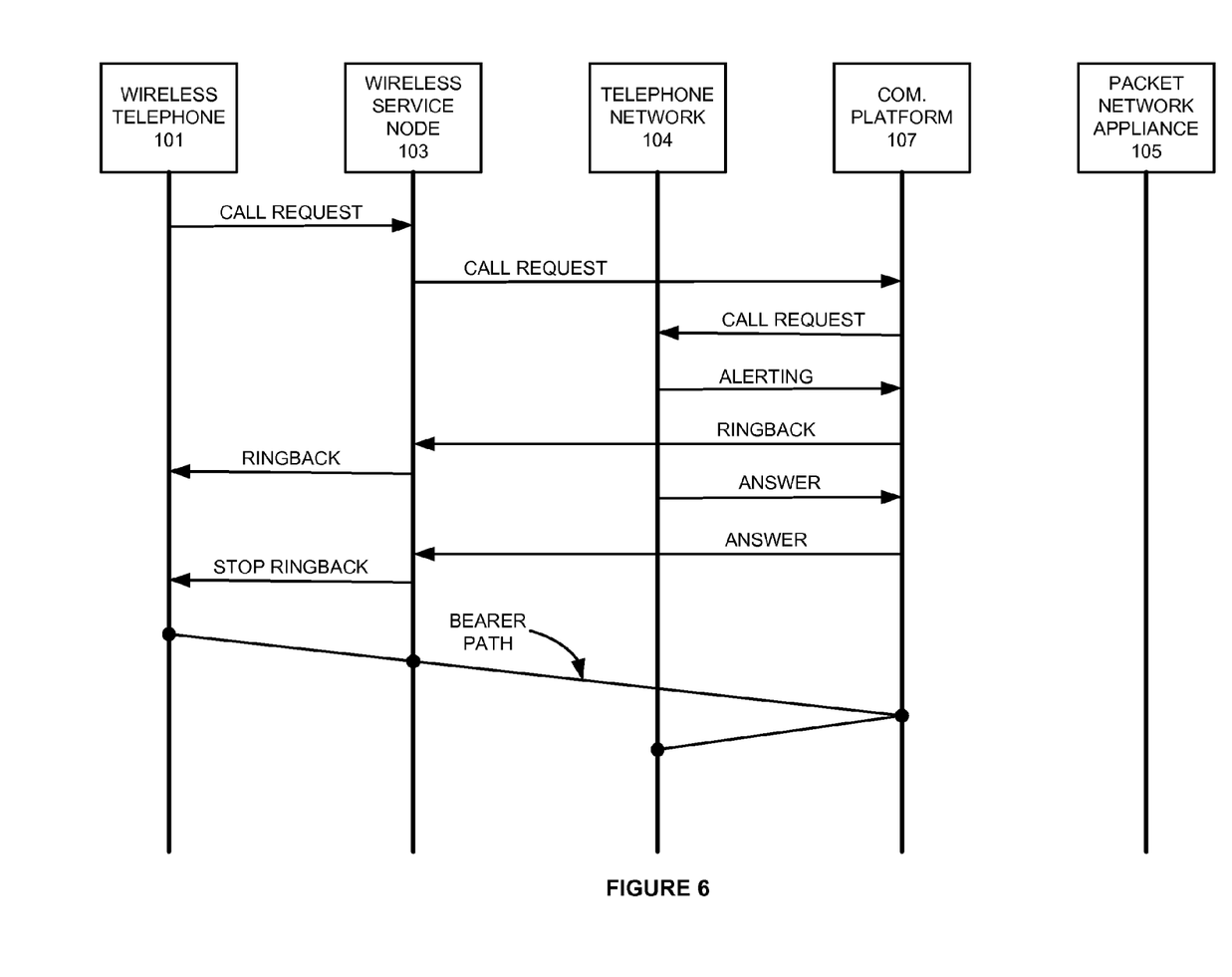
FIG. 6 illustrates a call from a wireless telephone through a telephone network to a called party in an example of the invention.

FIG. 6 illustrates a call from wireless telephone 101 through telephone network 104 to a called party in an example of the invention. The user operates wireless telephone 101 to transfer call request signaling to wireless service node 103. In response to the call request signaling from wireless telephone 101, wireless service node 103 transfers call request signaling to platform 107 and establishes a bearer path to platform 107. In response, platform 107 transfers a call request, such as an SS7 IAM, to telephone network 104. Platform 107 places the shared telephone number as the caller telephone number in the call request signaling to telephone network 104. Thus, the telephone number shared with packet network appliance 105 is delivered to the caller as the Automatic Number Identification (ANI) on calls placed by wireless telephone 101.

Platform 107 also extends the bearer path to telephone network 104. Platform 107 receives alerting signaling from telephone network 104 indicating that the called party is being alerted. In response to the alerting signaling, platform 107 transfers ringback signaling to wireless service node 103, and wireless service node 103 transfers ringback signaling to wireless telephone 101. In response to the ringback signaling, wireless telephone 101 plays a ringback tone to the caller (the user of wireless telephone 101). Platform 107 receives answer signaling from telephone network 104 indicating that the called party has answered the call, and in response, platform 107 transfers answer signaling to wireless service node 103. In response to the answer signaling, node 103, platform 107, and telephone network 104 cut-through the bearer path. Wireless service node 103 also transfers stop ringback signaling to wireless telephone 101, and wireless telephone 101 stops playing the ringback tone to the caller. Platform 107 also logs the call as described above. At this point, the duplex bearer path for the call extends from wireless telephone 101 to wireless service node 103 to platform 107 to telephone network 104 and on to the called party (not shown).

In the above examples, the user could initiate calls from either wireless telephone 101 or packet network appliance 105. Note that the same telephone number is delivered as the ANI on these calls. On incoming calls to the shared telephone number, note that the user has the option of answering the call over either wireless telephone 101 or packet network appliance 105. This option is facilitated by the use of simultaneous ringing and separate potential bearer paths. Advantageously, wireless telephone 101 and packet network appliance 105 share the same telephone number. Also note that calls can be routed through platform 107, so platform 107 can log all calls and apply additional services.

Figure 7:
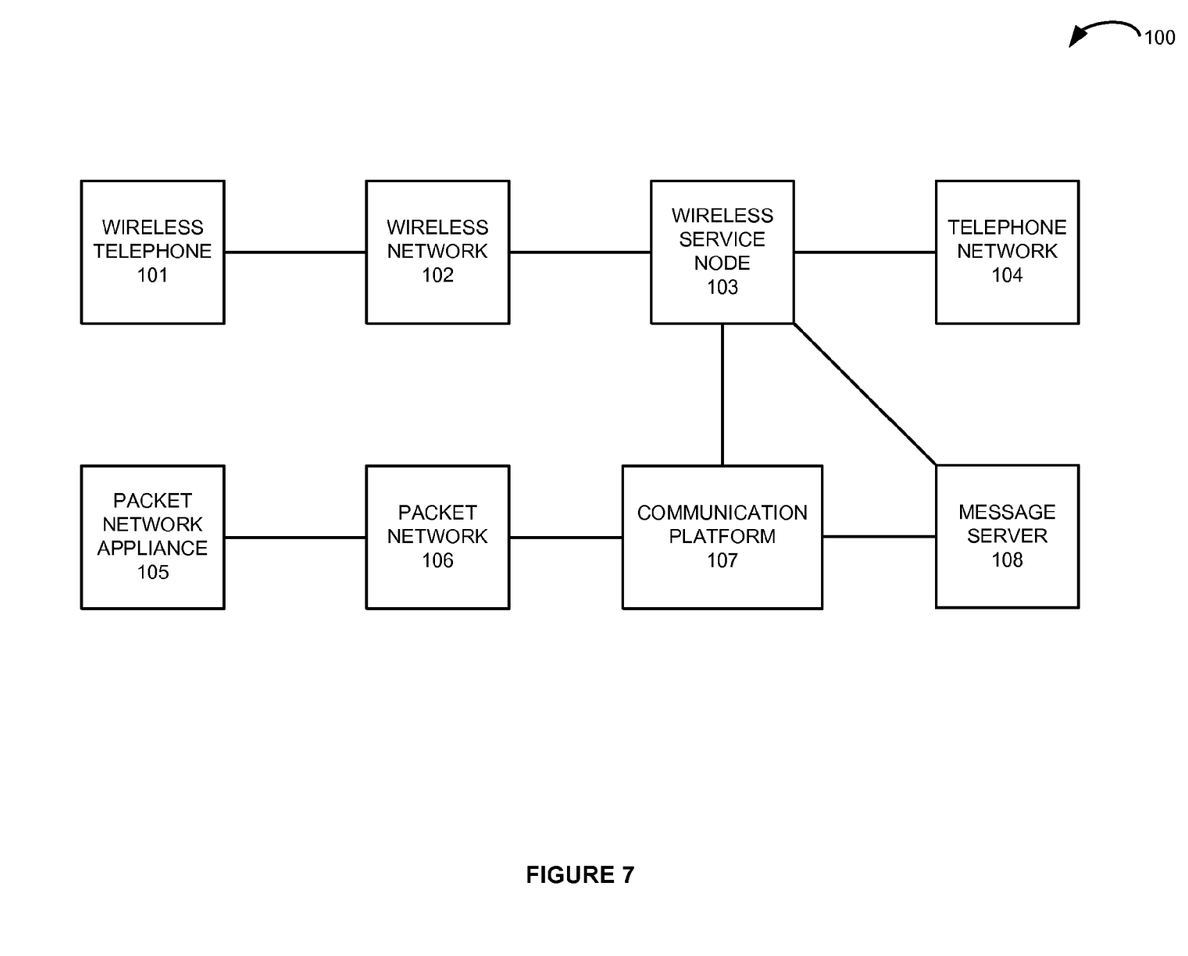
FIG. 7 illustrates a messaging service in an example of the invention.

FIG. 7 illustrates a messaging service in an example of the invention. Communication system 100 now includes message server 108. Message server 108 could support a Short Message Service (SMS), or some other form of messaging service. When message server 108 receives a message for wireless telephone 101, message server 108 forwards the message to wireless telephone 101 over a messaging channel—typically a signaling link through wireless service node 103 and network 102. Message server 107 also forwards the message to platform 107. Platform 107 transfers the message to packet network appliance 105. Thus, messages for the user of wireless telephone 101 that are received into message server 108 are transferred to both wireless telephone 101 and packet network appliance 105.

Alternatively, when message server 108 receives a message for wireless telephone 101 or packet network appliance 105, message server 108 forwards the message to platform 107. In response, platform 107 transfers the message through wireless service node 103 to wireless telephone 101, and platform 107 also transfers the message to packet network appliance 105.

If desired, platform 107 can discard messages for appliance 105 if appliance 105 is not logged in to platform 107. If desired, platform 107 can discard messages for wireless telephone 101 if telephone 101 is not on. Alternatively, the user can log into platform 107 and select message routing—route to both, route to telephone 101, or route to appliance 105.

Wireless telephone 101 transfers messages to message server 108 over the messaging channel. In response, message server 108 forwards the message to the appropriate recipient. Alternatively, wireless telephone 101 could transfer the messages to platform 107, and platform 107 could transfer the messages to message server 108. Packet network appliance 105 also transfers messages to platform 107. This message transfer could use SIP over signaling link 211. Platform 107 forwards the message to message server 108. This message forwarding could use SMS. In response, message server 108 forwards the message to the appropriate recipient.

Figure 8:
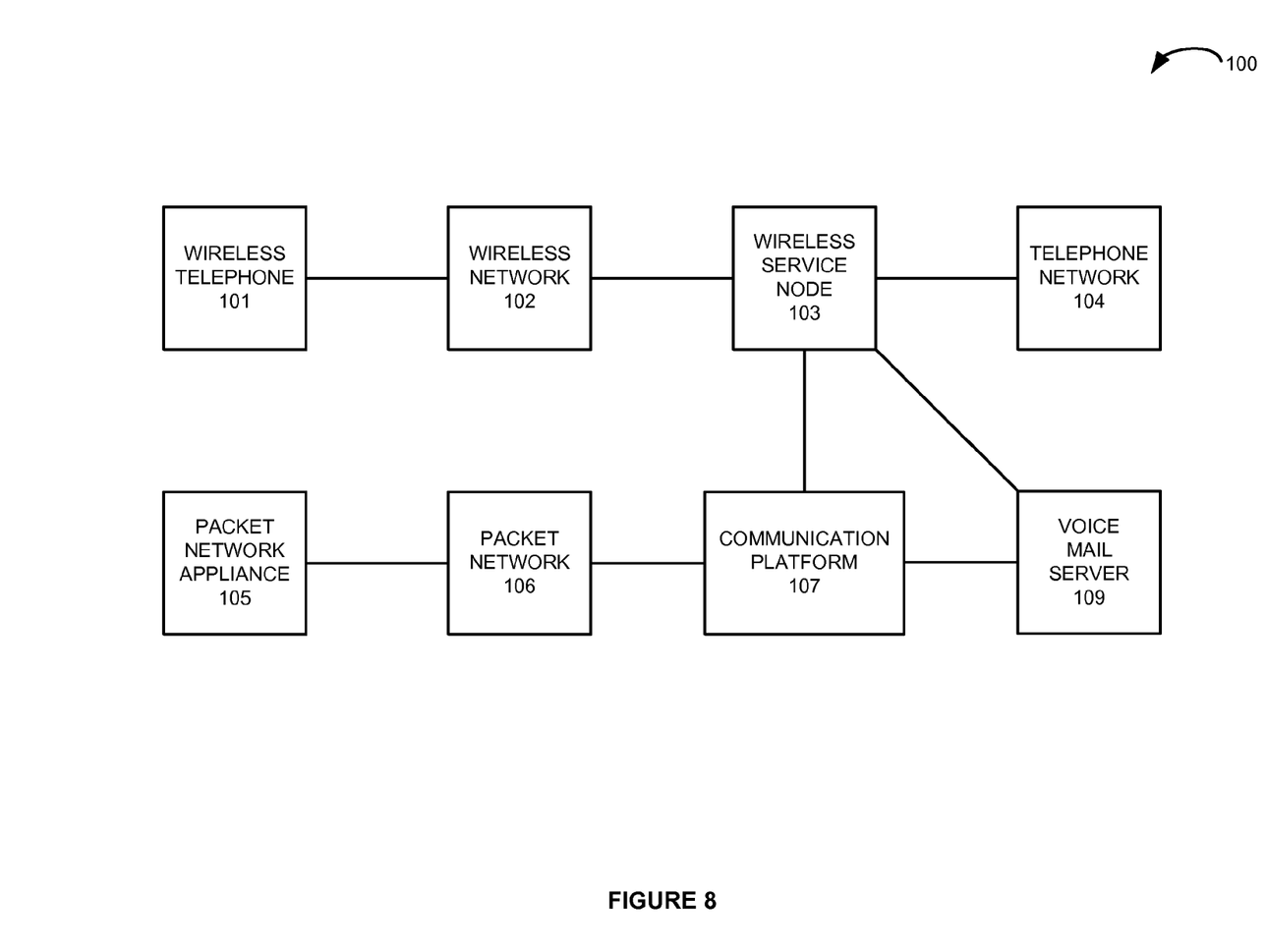
FIG. 8 illustrates a voice mail service in an example of the invention.

FIG. 8 illustrates a voice mail service in an example of the invention. Communication system 100 now includes voice mail server 109. When an incoming call is not answered by the user from either wireless telephone 101 or appliance 105 after a set time period or number of rings, platform 107 extends the call to voice mail server 109. The caller then leaves a voice mail for the user with voice mail server 109. Voice mail server 109 informs platform 107 that a voice message has been received for the shared telephone number. In response, platform 107 transfers a message waiting indicator over a signaling channel to wireless telephone 101, and wireless telephone 101 indicates the waiting message to the user through a tone, icon, or some other notice. Platform 107 also transfers a message waiting indicator over the signaling channel to packet network appliance 105, and network appliance 105 indicates the waiting message to the user through a tone, icon, or some other notice.

The user may access the voice mail through wireless telephone 101 by calling voice mail. Wireless service node 103 extends the call to voice mail server 109, and the user interacts with voice mail server 109 to access the voice mail. The user may also access the voice mail through network appliance 105 by calling voice mail. Platform 107 extends the call to voice mail server 109, and the user interacts with voice mail server 109 to access the voice mail.

After the voice mail is accessed by the user, voice mail server 109 informs platform 107 that no messages are awaiting. In response, platform 107 transfers a no message waiting indicator over the signaling channel to wireless telephone 101, and wireless telephone 101 removes the message waiting indication. Platform 107 also transfers a no message waiting indicator over the signaling channel to packet network appliance 105, and network appliance 105 removes the message waiting indication.

In some examples, wireless service node 103 may also have an associated voice mail server (not shown). Unanswered calls could also be transferred to this voice mail system. Thus, the voice mail operations described above could be distributed between voice mail server 109 and the voice mail server associated with wireless service node 103.

Note that communication platform 107 typically handles calls to and from the telephone number. This enables platform 107 to maintain a detailed call log for the telephone number by allocating calls into lists for incoming calls, outgoing calls, received calls, and recent calls—even if appliance 105 is used on the call. Each list indicates the telephone numbers, time, date, and user device (telephone 101 or appliance 105) associated with each call. The user may access their call log through packet network appliance 105 by accessing platform 107 over packet network 106.

Once the user logs-in to platform 107, platform 107 provides a Graphical User Interface (GUI) with options, and one of the options is to view the call log. When viewing the call log through appliance 105, the user may place another call by selecting one of the calls. Platform 107 then initiates a call from appliance 105 to telephone network 104 using the telephone number from the selected entry. Wireless telephone 101 could maintain its own call log for the calls it actually handles, or the call log in telephone 101 could be synchronized with the call log in platform 107 over the signaling channel.

Wireless telephone 101 maintains a personal address book. The personal address book includes a list of names and telephone numbers. Platform 107 maintains copy of the personal address book, and the two personal address books can be synchronized over the signaling channel. If the user modifies the personal address book in telephone 101, then the change is reflected in the personal address book in platform 107. If the user modifies the personal address book in platform 105, then the change is reflected in the personal address book in telephone 101.

In addition, the user may access their personal address book in platform 107 through packet network appliance 105 over packet network 106. Once the user logs-in to platform 107, platform 107 provides a Graphical User Interface (GUI) with options, and one of the options is to view and edit the personal address book. When viewing the personal address book through appliance 105, the user may place another call by selecting one of the address book entries. Platform 107 then initiates a call from appliance 105 to telephone network 104 using the telephone number from the selected entry. Note that the user can also initiate calls in a similar fashion from telephone 101 using its personal address book.

Advantageously, wireless telephone 101 and packet network appliance 105 share the same telephone number. Communication network 100 integrates several services for wireless telephone 101 and packet network appliance 105. The user has the option of using either wireless telephone 101 or packet network appliance 105 to place and answer calls, send and receive messages, and access voice mail. The user also has the option of accessing a call log or personal address book from either wireless telephone 101 or packet network appliance 105. The user may then place calls from either the call log or the personal address book.

What is claimed is:

1. A method of operating a communication system comprising:
   receiving a communication directed to a phone number;
   determining that the phone number is shared by a wireless phone and a packet appliance, and then determining that the wireless phone is logged-in to a wireless communication network and the packet appliance is logged-in to a packet communication network;
   simultaneously transferring the communication to the wireless phone in the wireless communication network and to the packet appliance in the packet communication network;
   wherein a ring instruction signaling to the wireless phone is SS7 IAM, wherein a ring instruction signaling to the packet appliance is SIP invite;
   maintaining a shared address book, a shared voice mail box, and a shared call log for the phone number, wherein the shared phone number is delivered to a caller as automatic number identification (ANI).

2. The method of claim 1 further comprising maintaining the shared address book for the telephone number and transferring the shared address book to the packet communication network for delivery to the packet appliance and transferring the shared address book to the wireless communication network for delivery to the wireless phone.

3. The method of claim 2 further comprising receiving a communication request over the wireless communication network generated by the wireless phone using the shared address book and receiving a different communication request over the packet communication network generated by the packet appliance using the shared address book.

4. The method of claim 1 further comprising maintaining the shared voice mail box for the telephone number and transferring a voice mail indication to the packet communication network for delivery to the packet appliance and transferring the voice mail indication to the wireless communication network for delivery to the wireless phone.

5. The method of claim 4 further comprising transferring a voice mail from the shared voice mail box over the wireless communication network for delivery to the wireless phone and transferring another voice mail from the shared voice mail box over the packet communication network for delivery to the packet appliance.

6. The method of claim 1 further comprising maintaining the shared call log for the telephone number and transferring the shared call log to the packet communication network for delivery to the packet appliance and transferring the shared call log to the wireless communication network for delivery to the wireless phone.

7. The method of claim 6 further comprising receiving a call request over the wireless communication network generated by the wireless phone using the shared call log and receiving a different call request over the packet communication network generated by packet appliance using the shared call log.

8. The method of claim 1 further comprising generating a record for the telephone number indicating if the communication was transferred to the wireless phone and indicating if the communication was transferred to the packet appliance.

9. The method of claim 1 wherein the communication comprises a voice call alert.

10. The method of claim 1 wherein the communication comprises a text message.

11. A communication system comprising:
    a wireless communication network;
    a packet communication network; and
    a communication platform configured to receive a communication directed to a phone number and determine that the phone number is shared by a wireless phone and a packet appliance, and then determine that the wireless phone is logged-in to a wireless communication network and the packet appliance is logged-in to a packet communication network;
    simultaneously transfer the communication to the wireless phone in the wireless communication network and to the packet appliance in the packet communication network;
    wherein a ring instruction signaling to the wireless phone is SS7 IAM, wherein a ring instruction signaling to the packet appliance is SIP invite;
    maintain a shared address book, a shared voice mail box, and a shared call log for the phone number, wherein the shared phone number is delivered to a caller as automatic number identification (ANI).

12. The communication system of claim 11 wherein the communication platform is configured to maintain the shared address book for the telephone number, transfer the shared address book to the packet communication network for delivery to the packet appliance, and transfer the shared address book to the wireless communication network for delivery to the wireless phone.

13. The communication system of claim 12 wherein the communication platform is configured to receive a communication request over the wireless communication network generated by the wireless phone using the shared address book and receive a different communication request over the packet communication network generated by the packet appliance using the shared address book.

14. The communication system of claim 11 wherein the communication platform is configured to maintain the shared voice mail box for the telephone number, transfer a voice mail indication to the packet communication network for delivery to the packet appliance, and transfer the voice mail indication to the wireless communication network for delivery to the wireless phone.

15. The communication system of claim 14 wherein the communication platform is configured to transfer a voice mail from the shared voice mail box over the wireless communication network for delivery to the wireless phone and transfer another voice mail from the shared voice mail box over the packet communication network for delivery to the packet appliance.

16. The communication system of claim 11 wherein the communication platform is configured to maintain the shared call log for the telephone number, transfer the shared call log to the packet communication network for delivery to the packet appliance, and transfer the shared call log to the wireless communication network for delivery to the wireless phone.

17. The communication system of claim 16 wherein the communication platform is configured to receive a call request over the wireless communication network generated by the wireless phone using the shared call log and receive a different call request over the packet communication network generated by packet appliance using the shared call log.

18. The communication system of claim 11 wherein the communication platform is configured to generate a record for the telephone number indicating if the communication was transferred to the wireless phone and indicating if the communication was transferred to the packet appliance.

19. The communication system of claim 11 wherein the communication comprises a voice call alert.

20. The communication system of claim 11 wherein the communication comprises a text message.

* * * * *